US012086122B2

(12) United States Patent
Madugula et al.

(10) Patent No.: US 12,086,122 B2
(45) Date of Patent: Sep. 10, 2024

(54) TASK DEPENDENCY EXTRACTION SHARING AND NOTIFICATION

(71) Applicant: International Business Machines Corporation, Armonk, NY (US)

(72) Inventors: Meenakshi Madugula, Newark, CA (US); Bailey Duncan, San Jose, CA (US); Nishtha Atrey, San Jose, CA (US); Archana Yadawa, San Jose, CA (US); Mu Qiao, Belmont, CA (US)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 18/046,523

(22) Filed: Oct. 14, 2022

(65) Prior Publication Data

US 2024/0126737 A1    Apr. 18, 2024

(51) Int. Cl.
*G06F 16/20* (2019.01)
*G06F 16/22* (2019.01)
*G06F 40/284* (2020.01)

(52) U.S. Cl.
CPC ........ *G06F 16/2264* (2019.01); *G06F 40/284* (2020.01)

(58) Field of Classification Search
None
See application file for complete search history.

(56) References Cited

U.S. PATENT DOCUMENTS

| 8,108,206 | B2 | 1/2012 | Hufnagel |
| 9,170,993 | B2 | 10/2015 | Kalia |
| 2017/0161372 | A1 | 6/2017 | Fernández |
| 2018/0182136 | A1* | 6/2018 | Zeyl .................. G06F 16/9024 |
| 2021/0294647 | A1 | 9/2021 | Chu |
| 2021/0406836 | A1 | 12/2021 | Bar-On |

FOREIGN PATENT DOCUMENTS

| JP | 2018524669 A | 8/2018 |
| WO | 2014116713 A1 | 7/2014 |
| WO | 2019165371 A1 | 8/2019 |

OTHER PUBLICATIONS

"Zenhub—Productivity Management for Software Teams", © Zenhub 2022, 7 pages, <https://www.zenhub.com/>.

(Continued)

*Primary Examiner* — Jau Shya Meng
(74) *Attorney, Agent, or Firm* — Tihon Poltavets

(57) ABSTRACT

A method, computer program product, and computer system are provided. A processor receives message data from a natural language conversation among participants in a project. A processor identifies at least two tasks mentioned in the message data. A processor determines a dependency between the at least two tasks based on the output of a sequential language model, where the messages associated with the at least two tasks are inputs to the sequential language model. A processor generates a directed graph depicting the at least two tasks and the determined dependency of the at least two tasks. A processor shares a directed graph across participants. A processor notifies participants who are blocked when dependent tasks are complete.

20 Claims, 5 Drawing Sheets

(56) References Cited

OTHER PUBLICATIONS

Disclosed Anonymously, "A Method of Cognitive Task Management Integrated with a Runtime &Idquo;To Do” Analysis", An IP.com Prior Art Database Technical Disclosure, IP.com No. IPCOM000254537D, IP.com Electronic Publication Date: Jul. 10, 2018, 4 pages.

Kushmerick et al., "Activity-Centric Email: A Machine Learning Approach", American Association for Artificial Intelligence, v.21, n.2, Copyright © 2006, 4 pages.

* cited by examiner

TASK DEPENDENCY EXTRACTION SHARING AND NOTIFICATION

BACKGROUND OF THE INVENTION

The present invention relates generally to the field of natural language processing, and more particularly to extracting tasks mentioned in messages in tandem with dependency of said tasks, sharing task data graph across all the participants, and notifying participants who are blocked due to dependencies once dependent tasks are marked as complete.

Numerous programs and platforms exist for users to share messages and collaborate on projects. Many projects comprise numerous component tasks, that when finished, contribute to the completion of a project. In various messaging programs, users typically speak in a natural language, as opposed to an artificial language via programmatic statements, to discuss the ongoing tasks for a project. Natural language processing (NLP) is a field of computer science dedicated to the interpretation and understanding of natural language statements, such as those regarding work and progress on tasks for a project.

SUMMARY

Embodiments of the present invention provide a method, system, and program product to determine task dependency from natural language messages regarding a project. A processor receives message data from a natural language conversation among participants in a project. A processor identifies at least two tasks mentioned in the message data. A processor determines a dependency between the at least two tasks based on the output of a sequential language model, where the messages associated with the at least two tasks are inputs to the sequential language model. A processor generates a directed graph depicting the at least two tasks and the determined dependency of the at least two tasks. A processor shares a directed graph across participants. A processor notifies participants who are blocked when dependent tasks are complete.

DETAILED DESCRIPTION

Figure 1:
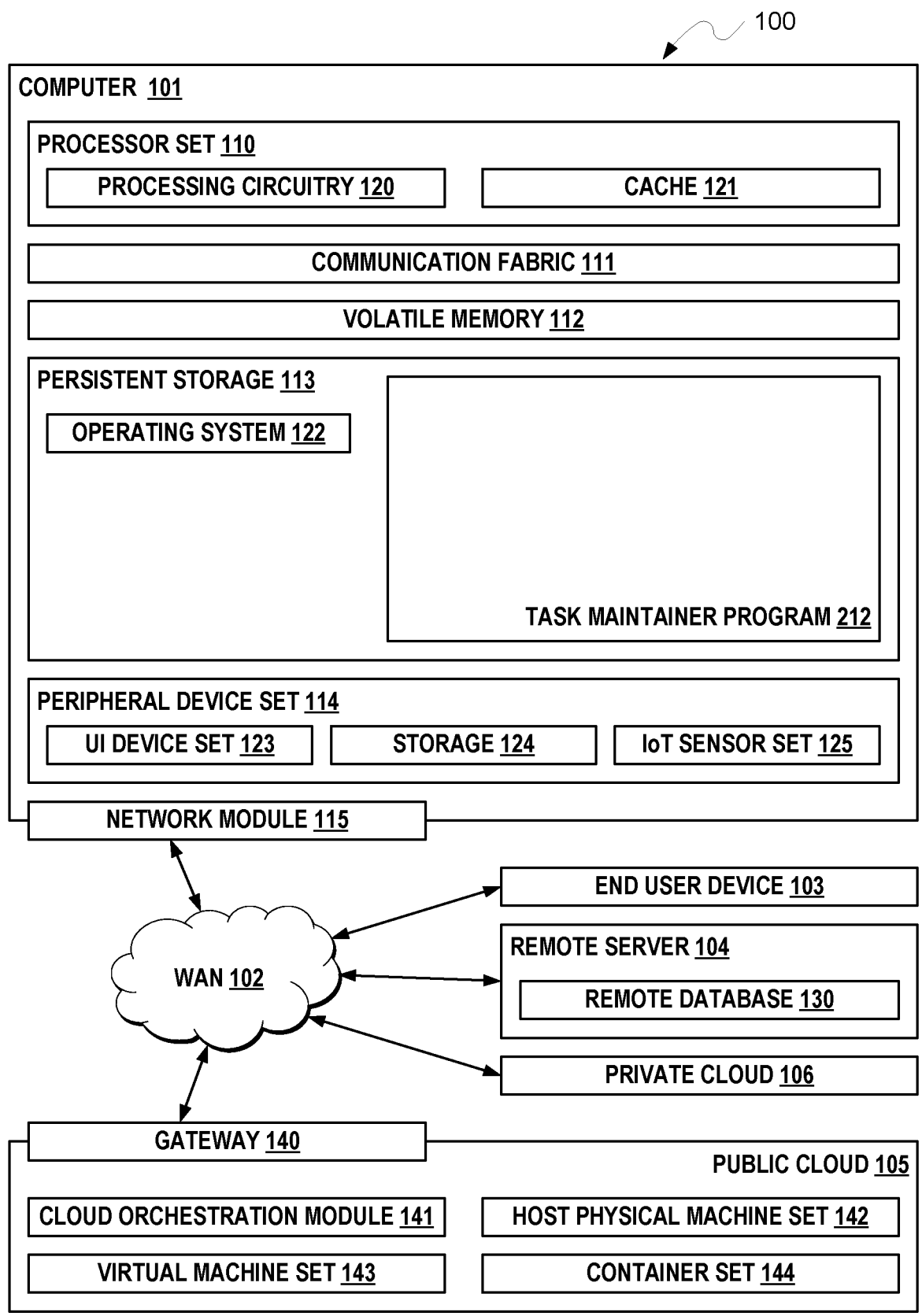
FIG. 1 depicts a block diagram of components of a computing device executing task maintainer program, in accordance with an exemplary embodiment of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as task maintainer program 212 which extracts tasks from message data while also extracting dependencies among the tasks, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and task maintainer program 212, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in task maintainer program 212 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in task maintainer program 212 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
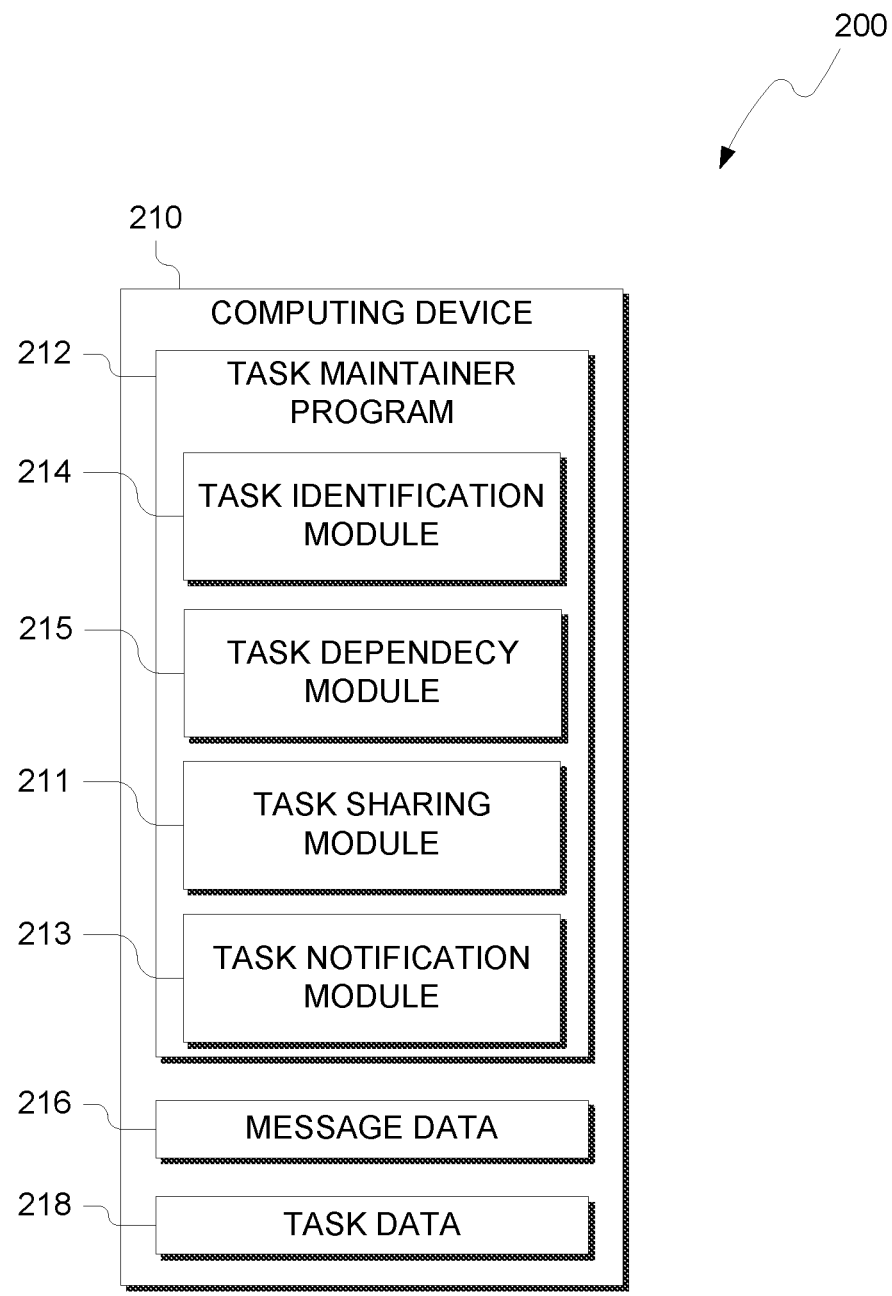
FIG. 2 is a functional block diagram illustrating a computing environment, in accordance with an exemplary embodiment of the present invention.

The present invention will now be described in detail with reference to the Figures. FIG. 2 is a functional block diagram illustrating computing environment, generally designated 200, in accordance with one embodiment of the present invention. Computing environment 200 includes computing device 210. Computing device 210 includes task maintainer (TM) program 212, with task identification module 214 and task dependency module 215, message data 216 and task data 218.

In various embodiments of the present invention, computing device 110 can be a standalone device, a server, a laptop computer, a tablet computer, a netbook computer, a personal computer (PC), or a desktop computer. In another embodiment, computing device 110 represents a computing system utilizing clustered computers and components to act as a single pool of seamless resources. In general, computing device 110 can be any computing device or a combination of devices with access to TM program 212, task identification module 214, task dependency module 215, message data 216 and task data 218. Computing device 110 may include internal and external hardware components, as depicted and described in further detail with respect to FIG. 1. In this exemplary embodiment, TM program 212, task identification module 214, task dependency module 215, message data 216 and task data 218 are stored on computing device 110. However, in other embodiments, TM program 212, task identification module 214, task dependency module 215, message data 216 and task data 218 may be stored externally and accessed through a communication network, such as WAN 102.

In various embodiments, TM program 212 has access to or is otherwise sent message data 216. Message data 216 includes any messages sent among participants of a project. As users participate in the project, the participants share messages and conversations with other users, which is stored as message data 216. Message data 216 may originate from any source and may also be collected across many different sources (such as different messaging platforms or channels/groups within the different platforms). Message data 216 as used herein can include any text message, written or automatically transcribed for audio/video conversations, that was shared among participants in a project.

Upon receipt of message data 216, TM program 212 extracts messages regarding one or more tasks of the project. Task identification module 214 identifies any tasks mentioned in message data 216. As extracted task messages are discovered, TM program 212 creates the task in task data 218. Task data 218 includes the various tasks associated with a project. Each task indicates some action or deliverable that needs to be performed. Once the action is performed or the deliverable finished, then the task associated with the action is completed. Additionally, as will be discussed herein, task data 218 indicates a task dependency among the tasks of the project. The task dependency indicates the order in which tasks must be completed to reach the project's goal. For example, a bake task for a cake must be completed before an icing task, to apply icing to a finished cake. In various embodiments, task data 218 is represented as a directed graph, such as depicted in FIG. 3B. One of ordinary skill in the art will appreciate that task data 218 may be stored and represented in a variety of manners, while illustrating task dependency, without deviating from the invention.

In various embodiments, task identification module 214 identifies tasks in message data 216 based on natural language processing (NLP) of message data 216. Initially, task identification module 214 parses each sentence in message data 216. After breaking message data 216 into sentences, task identification module 214 breaks the sentences apart into tokens or atomic logical terms (e.g., short sentences, phares or words). Then, task identification module 214 assigns "parts of speech" (PoS) tags to the various tokens such as "noun", "verb", "proper noun" "adjective" as well as "imperative", "non-modal verb", "modal verb" and "present tense verb". Based on the PoS tags, task identification module 214 identifies any messages that contain either imperative or declarative sentences. Messages that contain either imperative or declarative sentences typically are directed towards instructional statements, such as completion or assignment of a task. In another embodiment, a machine learning method can be applied to identify if there is a task or an actionable item present in a sentence. For example, logistic regression, support vector machines (SVM), Naive Bayes classifier, as well as neural networks can be used herein to train a binary classifier based on the text features of sentences (labelled as true if there is a task or an actionable item present in the sentence, otherwise labelled as false). As such, task identification module 214 identifies such tasks for being added to or updating preexisting task data 218.

Additionally, task identification module 214 identifies entities mentioned in message data 216 for extracted tasks. As mentioned above, task identification module 214 assigns PoS tags to message data 216, such as "proper noun". As such, task identification module 214 also identifies the entities mentioned in each message. Each task is assigned at least one participant that is responsible for the task's completion. For instructive statements such as "Could 'Person A' please create a prototype before deployment", the responsible entity would be the one mentioned in the message (i.e., Person A). For declarative statements such as "I will create a prototype before deployment", the responsible entity would be the author of the message. When a responsible entity for a task is identified, then task identification module 214 updates task data 218 to reflect the responsible entity for the task.

In various embodiments, TM program 212 also determines if any extracted task messages indicate a dependency or relationship among the discussed tasks. Task dependency module 215 selects various extracted task messages to determine if any dependency among the tasks mentioned is present in message data 216. If two or more messages indicted a dependency, then TM program 212 updates task data 218 to reflect the dependency among the tasks.

In various embodiments, task dependency module 215 includes a sequential language model for classifying the presence of a task dependency between two messages in message data. For example, task dependency module 215 includes a Bidirectional Encoder Representations from Transformers, or BERT, model to determine the dependency relationship between two messages. A BERT model is a neural network transformer model that digests sequential text from the document (i.e., sentences or paragraphs) and generates word embeddings or phrase embeddings (e.g., more than one word of the document is represented by the embedding) representing the topics or concepts discussed in the text. In this instance and in various embodiments, the BERT model is a classification model that classifies a relationship between two messages in message data 216. The model determines one of three classifications between a first task mentioned in message A and a second task mentioned in message B. The first is that no dependency is present between the tasks mentioned in the messages. The second classification is if the first task depends on the second task, with the third being that the second task depends on the first task.

Once TM program 212 extracts message data 216, determines entities and tasks mentioned, as well as any dependencies mentioned or inferred in a natural language statement, then TM program 212 updates task data 218 to reflect to relationships discussed above.

In various embodiments, task sharing module 211 distributes the generated task data 218 to participants of the projects as well as other users that are following, tracking or otherwise involved with the project. As participants mention tasks that need to be performed for a project in message data 216, task sharing module 211 sends the newly added tasks to other users via task sharing module 211 by sending task data 218, or the portion thereof that has been updated in light of message data 216. Each user can access a task viewing program (not shown) to view and interact with the shared task data 218.

In various embodiments, task notification module 213 notifies or otherwise alerts users the status of tasks in task data 218. When a task is marked as complete after digesting messages in message data 216, task notification module 213 notifies participants and other users completion of the task. As discussed herein, when a user makes a declarative statement such as "I have updated the program with the bug fix", task maintainer program 212 identifies that the task has been completed. When message data 216 indicates that a task has been completed, task notification module 213 sends a notification to various users indicating that a participant has indicated the task is complete.

Task notification module 213 provides notifications to relevant users when any messages data 216 indicates a task has been added, updated or completed. Additionally, task notification module 213 provides notifications if any dependent tasks are added to a task relevant to a user. If a new dependent task is added that may delay a following task, task notification module 213 provides notifications to relevant users indicating the new preceding task. Furthermore, if a message indicates a completion date (e.g., "I will push the new build next week"), then task notification module 213 includes the estimated completion time in the notification. In some scenarios, task notification module 213 identifies relevant users to a task any updates to the task in task data 218. In one example, relevant users may include participants who supplied or viewed messages data (e.g., users in a channel or room). In another example, based on the type of task, relevant users may include users whose role is relevant to a task that has been updated (i.e., all tasks regarding database errors are sent to a database administrator). In a third example, relevant users may include users whose tasks can be started as all the dependent tasks have been marked as complete.

Figure 3A:
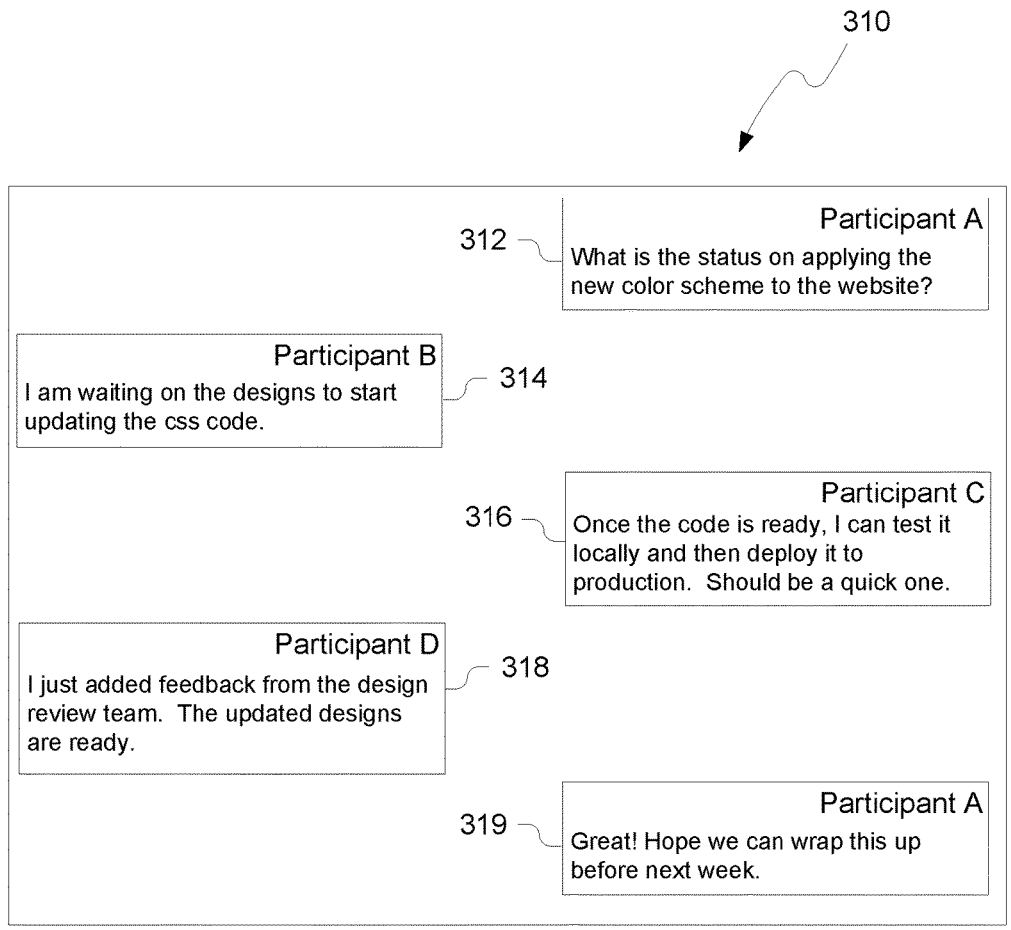
FIGS. 3A and 3B depict an example of task maintainer program extracting example message data to create example task data.
Figure 3B:
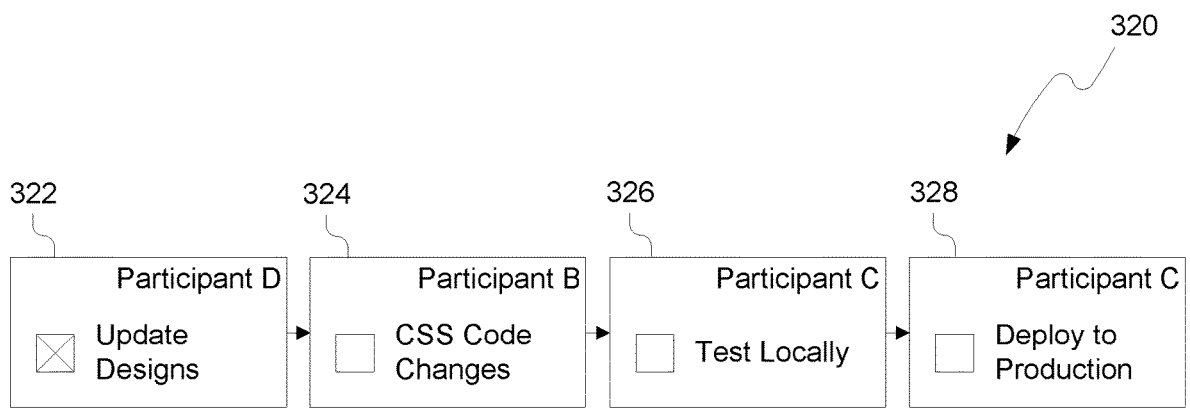

FIGS. 3A and 3B depict an of TM program 212 extracting example message data 310 to create example task data 320. FIG. 3A depicts an example of message data 216 as example message data 310. The example includes five messages 312-319 including four participants A-D discussing a project of updating the color scheme to a production website. In message 312, Participant A requests the "status on applying the new color scheme to the website" via a natural language message shared with Participants B, C and D. In message 314, Participant B states they are "waiting on the designs to start updating the css code" (cascading style sheet). In message 316, Participant C states they will "test it locally and then deploy it to production". In message 318, Participant D states they will "add feedback from the design review team" as well as stating that the "updated designs are ready". In message 319, Participant A finishes the conversation stating the participants should "wrap this up before next week".

Example task data 320 illustrates the resulting task data 218 generated based on the example message data 310. Initially, TM program 212 retrieves example message data 310 and identifies any actionable tasks that are present. Based on PoS tagging and structure of the messages, TM program 212 identifies actionable tasks based on the format of the message. For example, imperative or declarative statements typically are instructive. Non-imperative or non-declarative messages may be omitted by TM program 212 since these types of statements are not instructive and therefore not contain messages related to tasks in a project.

In message 312, TM program 212 identifies an interrogative statement that requests status of a project. Since the statement is not imperative or declarative, then TM program 212 does not assign a task to the message. When TM program 212 encounters questions or other interrogative statements, TM program 212 compares the entities or subjects in the message to determine if any pre-existing task data 218 is present to match the question. In such cases, TM program 212 can identify any ongoing or otherwise monitored tasks in task data 218 that may be relevant to messages data 310. In this example, TM program 212 identifies no project or tasks that relate to message 312, therefore example task data 320 is created based on example message data 310. In instances where ongoing or otherwise monitored tasks in task data 218 match example message data 310, then TM program 212 updates the relevant task data based on the messages contained in the responses.

For message 314, TM program 212 identifies a declarative statement "I am waiting on designs . . . ". The statement declares that Participant B is "waiting on the designs" and that the designs are needed to "updat[e] the css code". As discussed herein, task identification module 214 identifies tasks in natural language messages based on PoS tagging. In this example, since message 314 includes two clauses with two present tense verbs, TM program 212 identifies two tasks: task 322, for updating the designs, and task 324, for updating the css code. As discussed in more detail in FIG. 5, task dependency module 215 of TM program 212 determines any causal or dependent relationship among the clauses in the sentence are present. In this example message 314, "waiting on the designs" predicates that the designs are needed prior to updating the CSS. As such, TM program 212 creates a task dependency from task 322 to be completed before task 324. Additionally, TM program 212 assigns tasks 322-328 to a responsible participant. Since in message 314 states that participant B will "updat[e] the css code", then TM program 212 assigns task 324 to participant B. For task 322, since message 314 does not mention a responsible participant to update designs, TM program 212 may not assign a participant or assign the project owner (i.e., Participant A) as a temporary participant.

In message 316, identifies two declarative statements "I can test it . . . " and "deploy it to production". Since both are declarative statement, TM program 212 creates tasks 326 and 328, assigning both the Participant C. Based on the dependent relationship in the natural language sentence structure (e.g., I can [TASK] and then [TASK]), task dependency module 215 of TM program 212 determines that task 326 for testing must occur before task 328 for deploying. Additionally, due to the clause "once the code is ready" when task dependency module 215 of TM program 212 compares message 316 to 314, a new dependency from task 324 for code completion to task 326 for testing.

Based on messages 312-316, TM program 212 constructs the overall structure and information presented in example task data 320. Messages 318 and 319 provide updates to example task data 320. In message 318, participant D states that they have updated the designs based on feedback. When new messages are received, TM program 212 evaluates each known task to determine if the message is discussing a pre-existing task. In this example message, since Participant D states they have completed a pre-existing task, then TM program 212 updates example task data 320 to indicate that task 322 is complete. Additionally, as discussed above task 322 did not have a responsible participant assigned to the task. Since Participant D stated they completed the task, TM program 212 updates task 322 to reflect proper ownership of Participant D.

In message 319, Participant A does not discuss a task, however, provides a message indicating a deadline or expected completion date for the task 322-328. When TM program 212 detects messages regarding the timeliness or completion time for tasks, TM program 212 may update task data 320 with reminders or other indicia of the expected completion timeframe for the tasks.

Figure 4:
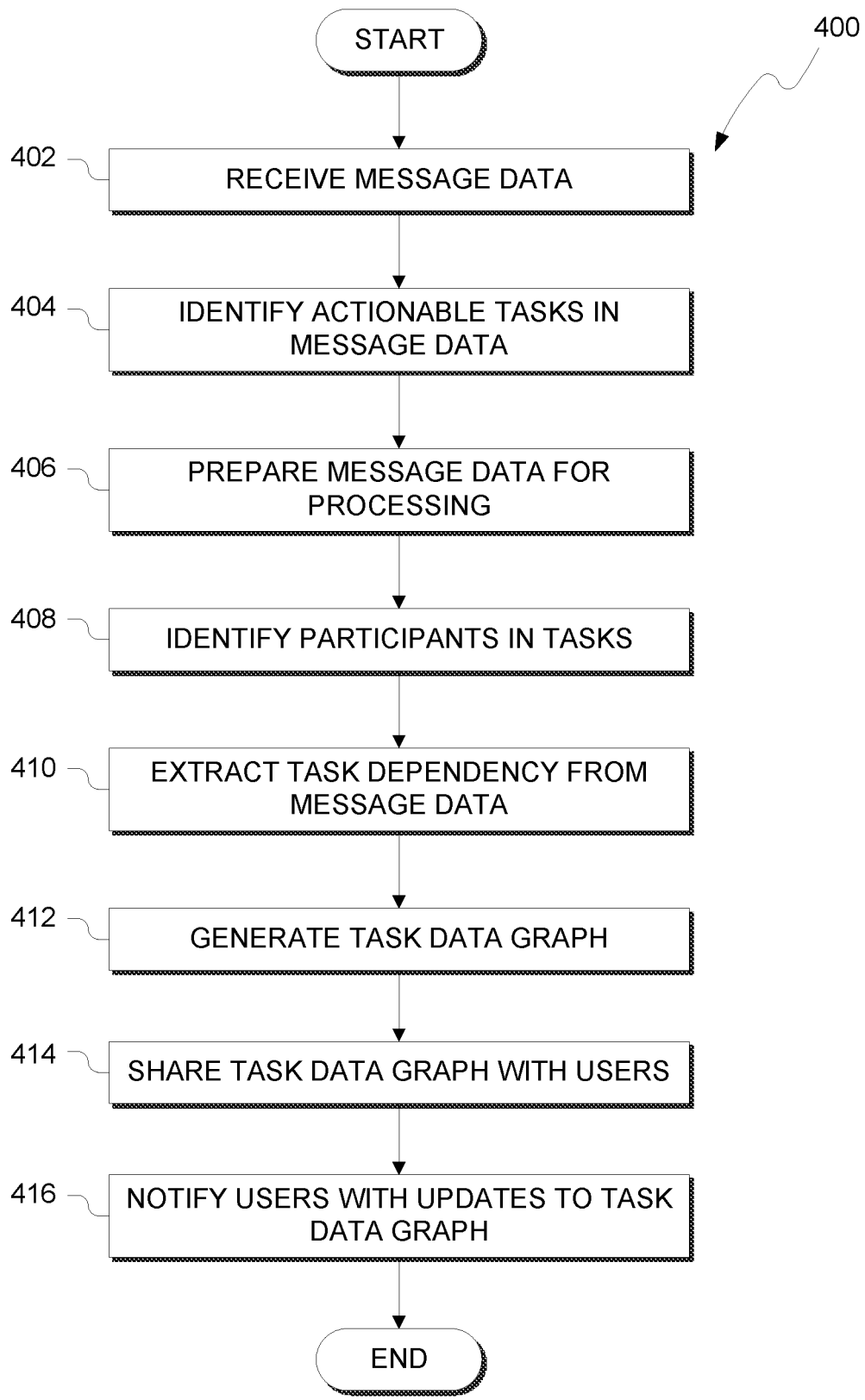
FIG. 4 illustrates operational processes of a task maintainer program, on a computing device within the environment of FIG. 1, in accordance with an exemplary embodiment of the present invention.

FIG. 4 depicts the operational processes, generally designated as 400, of TM program 212. In process 402, TM program 212 retrieves message data 116. Message data 216 includes any natural language text that participants share in regards to working on a project, such as those shared in a chatroom/channel or direct messages shared among participants. In some scenarios where message data 216 includes audio recordings, TM program 212 transcribes or otherwise converts the audio into text for analysis.

In process 404, TM program 212 identifies actionable tasks present in message data 216. Based on PoS tagging, TM program 212 identifies any statements that are declarative or imperative statements, since these types of statements are typically instructional or confirmational and will indicate progress and other actionable items in a project. In process 406, TM program 212 prepares message data 216 for processing. In order to be processed by task dependency module 215, message data 216 needs to be prepared beyond the raw text that is present. Initially, TM program 212 removes any stop words from message data 216. Stop words are any words that are not beneficial in NLP understanding of the text. For example, articles, prepositions, and other words or phrases that may not be trained to be processed by a language model such as BERT.

In process 408, TM program 212 identifies any participants in message data 216. Task identification module 214 identifies any entities mentioned in message data 216. As mentioned above, task identification module 214 assigns PoS tags to message data 216, such as "proper noun". As such, task identification module 214 also identifies the entities mentioned in each message. Each task is assigned at least one participant that is responsible for the task's completion.

In process 410, TM program 212 extracts task dependency from each message related to a project in message data 216. In various embodiments, task dependency module 215 determines a causality or dependency between two messages in message data 216. Based on the analysis of task dependency module 215, TM program 212 determines if two messages have a dependent relationship, meaning one task in a first message must be performed before another task mentioned in another message. Looking back to FIGS. 3A and 3B, each message 312-319, or portions of each message, are compared by task dependency module 215 to determine based on natural language understanding if one task needs to be completed before another. Once TM program 212 determines a dependent relationship, TM program 212 generates task data 218 to indicate the determined task dependency relationship (such as in FIG. 3B).

In process 414, TM program 212 shares the task data graph with other users. As task data 218 is updated in process 412, task sharing module 211 sends the updated task data 218 to various participants in the project as well as any of users that may wish to track the project monitored in task data 218. In process 416, TM program 212 notifies users with updates to the task data graph. Based on the task mentioned in message data 216 and represented in task data 218, task notification module 213 determines relevant users in the project. TM program 212 sends a notification to the relevant users, indicating the completion status, new dependencies and estimated completion of the updated tasks.

Figure 5:
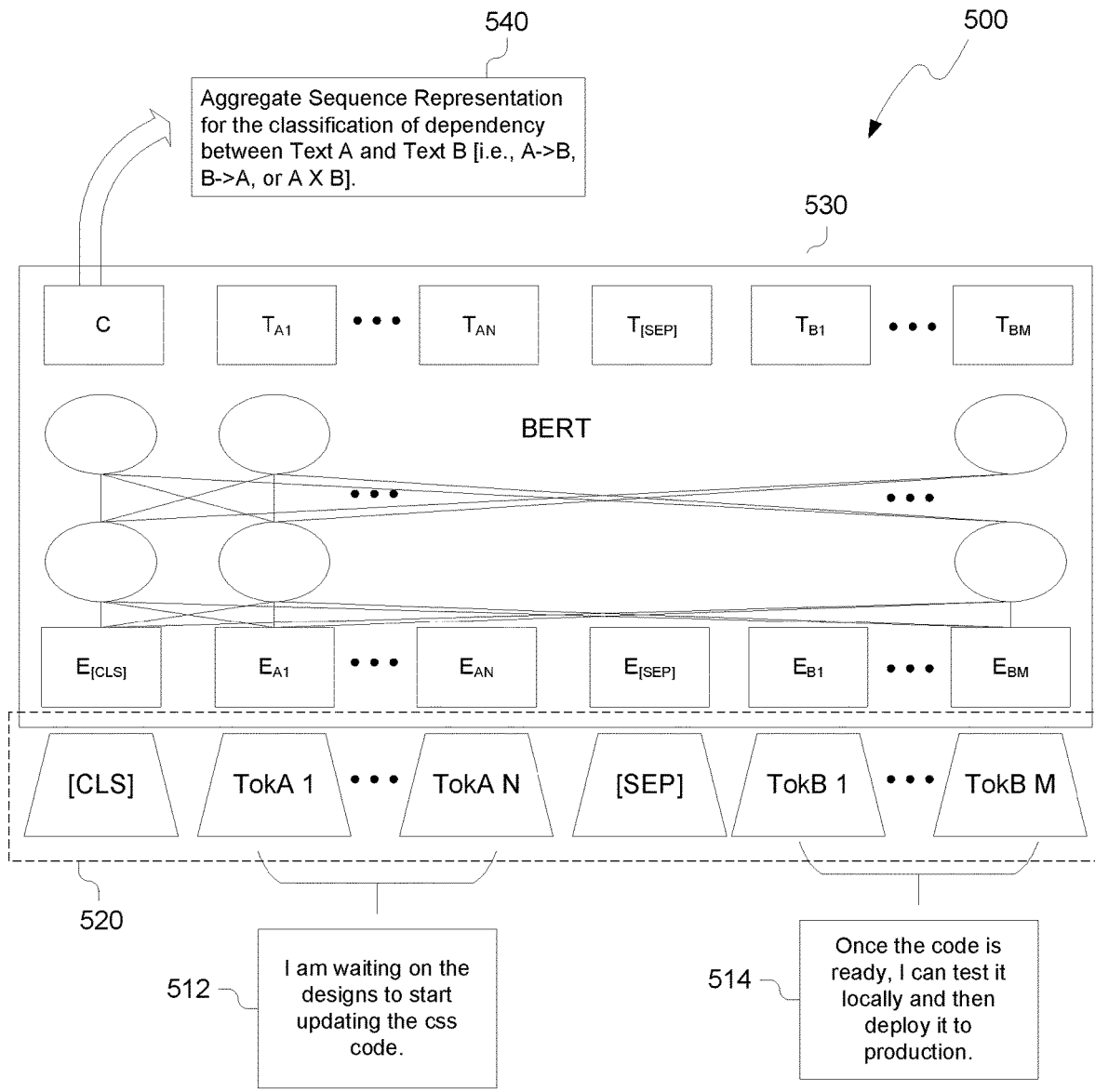
FIG. 5 depict an example machine learning model for task dependency determination from message data.

Looking to FIG. 5, FIG. 5 depicts machine learning model 500. As previously discussed, machine learning model 500 includes pre-trained BERT model 530. For example, a BERT model is pre-trained to handle natural language understanding for a language, such as English or Japanese. In some scenarios, additional training of the BERT model may be performed based on a domain such as DevOps, manufacturing, or any domain specific terms that may be used in a production environment.

BERT models are transformer neural network models that compose an input layer ($E_{[cls]}$, $E_{A1}$ . . . $E_{AN}$, $E_{[Sep]}$, $E_{B1}$ . . . $E_{BM}$), various hidden layers, and an output layer (C, $T_{A1}$ . . . $T_{AN}$, $T_{[Sep]}$, $T_{B1}$ . . . $T_{BM}$). When trained, the weights of the neural network are updated such that output layer produces output expected based on a given input. The input layer of BERT model 530 is provided tokenized string 520 of two portions of text from message data 216. Example texts 512 and 514 show non-tokenized strings of original message data 218. As discussed herein message data 216 is prepared tokenizing each word with Parts-of-Speech tags to determine sentence structure to identify imperative, declarative and other types of sentences. Additionally, processing and tokenizing may occur. For example, task identification module 214 may insert hard coded tokens to represent certain tasks such as the phrase, "Have you pushed the update" may insert a token to represent a specific instance of a "push update task" (i.e., "Have you [TASK #101]?"). One of ordinary skill in the art will appreciate that a variety of pre-processing and tokenization of message data 216 may occur without deviating from the invention.

In various embodiments, each message or portion thereof, in message data 216 is tokenized and separated before being supplied to BERT model 530 (i.e., message 512 is tokenized to TokA 1 to TokA N, and message 514 is tokenized to TokB 1 to TokB M). Tokenized string 520 also includes two special tokens used to train BERT model 530 to classify task dependency in message data 216, that being the CLS token and the SEP token.

The CLS token is a special token in BERT models used for classification tasks. The hidden state corresponding to CLS, i.e., C 540 in the output layer, is used as the aggregate sequence representation for classification tasks. C 540 is used to generate a classification label based on the two messages 512 and 514 that indicates one of three classifications: (1) Task in Message A (i.e., message 512) precedes Task in Message B (i.e., message 514), indicated as "A→B"; (2) Task in Message B (i.e., message 514) precedes Task in Message A (i.e., message 512), indicated as "B→A"; or (3) No causality or dependency found, indicated as "A×B". C 540 is fed into a neural network layer for classification (to obtain the classification label of dependency). The classification layer of BERT model 530 can be a single dense or fully connected neural network. Additionally, C 540 can also be learned by fine tuning a pre-trained BERT model. In this instance, suppose the weights of the neural network classification layer is W and the hidden state corresponding to CLS is C, BERT model 530 only needs to determine W using the standard classification loss (i.e., $\log(\text{softmax}(CW^T))$).

The SEP token is a special token that separates sentences in a BERT model. Initially, the BERT model was generated to predict the next sentence in a conversation in order to provide a chat or conversation agent to users. Embodiments of the present invention leverage the next sentence prediction training of the BERT model by determining if the BERT model predicts a string of text likely proceeds of follows another string of text. As such, a SEP token is inserted between each message being analyzed for task dependency (i.e., messages 512 and 514). Once the BERT model is pre-trained with this form of tokenization, C 540 will be able to provide accurate predictions of task dependency between two messages.

Returning to FIG. 4, in process 412, TM program 212 generates a task data graph, such as example task data 320 in FIG. 3B. The task data graph presents each task captured from message data 216 (process 404), as well as the dependencies determined by task dependency module 215 (process 410). In some scenarios, based on ongoing message data 216, TM program 212 updates the task data graph based on the received messages. For example, if a user mentions a known task but provides another task, then TM program 212 compares the message to the known task to determine the dependency, if present, between the known task and the new message. Additionally, TM program 212 tracks completion statements as well. If a message indicates the user has completed a task, then TM program 212 updates task data 218 to reflect the task has been completed. Furthermore, if message data 216 indicates any due dates or time frame of a task, then TM program 212 assigns an alarm or other indication that a task is due to be completed at the time mentioned in the message.

Some embodiments of the present invention are directed to a computer-implemented method including: receiving message data from a natural language conversation among participants in a project, identifying at least two tasks mentioned in the message data, determining a dependency between the at least two tasks based on the output of a sequential language model, where the messages associated with the at least two tasks are inputs to the sequential language model, generating a directed graph depicting the at least two tasks and the determined dependency of the at least two tasks, sharing a directed graph across participants and notifying participants who are blocked when dependent tasks are complete. Advantageously, embodiments of the present invention automate and improve task tracking in a project by digesting natural language message data. By determining dependencies of the tasks based on a natural language understanding of the messages, embodiments of the present invention can automatically generate complex directed graphs for task management in a project.

One aspect of the computer-implemented method disclosed herein may include where the sequential language model is based on a Bidirectional Encoder Representations from Transformer (BERT) model. Advantageously, the BERT model can provide a pretrained sequential language model to be further trained to determine task dependency in natural language message data.

Another aspect of the computer-implemented method disclosed herein may include tokenizing the messages associated with the at least two tasks, wherein a separator token is inserted between the messages associated with the at least two tasks. Advantageously, the separator token enables the BERT model to differentiate tasks in message data for dependency.

Yet another aspect of the computer-implemented method disclosed herein may include where the tokenized messages include a classification token to identify a dependency between the messages associated with the at least two tasks. Advantageously, the BERT model utilizes the hidden state classification token to train for determination of task dependency in message data.

Still yet another aspect of the computer-implemented method disclosed herein may include where the BERT model is trained to detect the dependency between the messages associated with the at least two tasks. Advantageously, the separator and classification tokens provide a methodology to train the BERT model to detect task dependency in message data.

A further aspect of the computer-implemented method disclosed herein may include where identifying the at least two tasks mentioned in the message data is based on a sentence structure of the messages associated with the at least two tasks and where the sentence structure of the messages associated with the at least two tasks are either imperative or declarative sentence structures. Advantageously, tasks can be identified based on Parts-of-Speech tagging and structure of the sentences found in message data.

Some embodiments of the present invention are directed toward a computer program product comprising a computer-readable storage medium having a set of instructions stored therein which, when executed by a processor, causes the processor to perform a method including: receiving message data from a natural language conversation among participants in a project, identifying at least two tasks mentioned in the message data, determining a dependency between the at least two tasks based on the output of a sequential language model, where the messages associated with the at least two tasks are inputs to the sequential language model, generating a directed graph depicting the at least two tasks and the determined dependency of the at least two tasks, sharing a directed graph across participants and notifying participants who are blocked when dependent tasks are complete. Advantageously, embodiments of the present invention automate and improve task tracking in a project by digesting natural language message data. By determining dependencies of the tasks based on a natural language understanding of the messages, embodiments of the present invention can automatically generate complex directed graphs for task management in a project.

One aspect of the computer program product may further include where the sequential language model is based on a Bidirectional Encoder Representations from Transformer (BERT) model. Advantageously, the BERT model can provide a pretrained sequential language model to be further trained to determine task dependency in natural language message data.

Another aspect of the computer program product may include tokenizing the messages associated with the at least two tasks, wherein a separator token is inserted between the messages associated with the at least two tasks. Advantageously, the separator token enables the BERT model to differentiate tasks in message data for dependency.

Yet another aspect of the computer program product may include where the tokenized messages include a classification token to identify a dependency between the messages associated with the at least two tasks. Advantageously, the BERT model utilizes the hidden state classification token to train for determination of task dependency in message data.

Still yet another aspect of the computer program product may include where the BERT model is trained to detect the dependency between the messages associated with the at least two tasks. Advantageously, the separator and classification tokens provide a methodology to train the BERT model to detect task dependency in message data.

A further aspect of the computer program product may include identifying the at least two tasks mentioned in the message data is based on a sentence structure of the messages associated with the at least two tasks and where the sentence structure of the messages associated with the at least two tasks are either imperative or declarative sentence structures. Advantageously, tasks can be identified based on Parts-of-Speech tagging and structure of the sentences found in message data.

Some embodiments of the present invention are directed toward a computer system including: a processor set; and a computer readable storage medium. The processor set is structured, located, connected, and/or programmed to run program instructions stored on the computer readable storage medium. The program instructions, when executed by the processor set, cause the processor set to perform a method including receiving message data from a natural language conversation among participants in a project, identifying at least two tasks mentioned in the message data, determining a dependency between the at least two tasks based on the output of a sequential language model, where the messages associated with the at least two tasks are inputs to the sequential language model, generating a directed graph depicting the at least two tasks and the determined dependency of the at least two tasks, sharing a directed graph across participants and notifying participants who are blocked when dependent tasks are complete. Advantageously, embodiments of the present invention automate and improve task tracking in a project by digesting natural language message data. By determining dependencies of the tasks based on a natural language understanding of the messages, embodiments of the present invention can automatically generate complex directed graphs for task management in a project.

One aspect of the computer system may further include where the sequential language model is based on a Bidirectional Encoder Representations from Transformer (BERT) model. Advantageously, the BERT model can provide a pretrained sequential language model to be further trained to determine task dependency in natural language message data.

Another aspect of the computer system may include tokenizing the messages associated with the at least two tasks, wherein a separator token is inserted between the messages associated with the at least two tasks. Advantageously, the separator token enables the BERT model to differentiate tasks in message data for dependency.

Yet another aspect of the computer system may include where the tokenized messages include a classification token to identify a dependency between the messages associated with the at least two tasks. Advantageously, the BERT model utilizes the hidden state classification token to train for determination of task dependency in message data.

Still yet another aspect of the computer system may include where the BERT model is trained to detect the dependency between the messages associated with the at least two tasks. Advantageously, the separator and classification tokens provide a methodology to train the BERT model to detect task dependency in message data.

A further aspect of the computer system may include identifying the at least two tasks mentioned in the message data is based on a sentence structure of the messages associated with the at least two tasks and where the sentence structure of the messages associated with the at least two tasks are either imperative or declarative sentence structures. Advantageously, tasks can be identified based on Parts-of-Speech tagging and structure of the sentences found in message data.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method comprising:
  receiving, by a processor, message data from a natural language conversation among participants in a project;
  identifying, by the processor, at least two tasks mentioned in the message data;
  determining, by the processor, a dependency between the at least two tasks based on the output of a sequential language model, wherein the messages associated with the at least two tasks are inputs to the sequential language model;
  generating, by the processor, a directed graph depicting the at least two tasks and the determined dependency of the at least two tasks;
  sharing, by the processor, a directed graph across participants; and
  notifying, by the processor, participants who are blocked subsequent to completion of dependent tasks.

2. The method of claim 1, wherein the sequential language model is based on a Bidirectional Encoder Representations from Transformer (BERT) model.

3. The method of claim 2, the method further comprising:
  tokenizing, by the processor, the messages associated with the at least two tasks, wherein a separator token is inserted between the messages associated with the at least two tasks.

4. The method of claim 3, wherein the tokenized messages include a classification token to identify a dependency between the messages associated with the at least two tasks.

5. The method of claim 4, wherein the BERT model is trained to detect the dependency between the messages associated with the at least two tasks.

6. The method of claim 1, wherein identifying the at least two tasks mentioned in the message data is based on a sentence structure of the messages associated with the at least two tasks.

7. The method of claim 6, wherein the sentence structure of the messages associated with the at least two tasks are either imperative or declarative sentence structures.

8. A computer program product comprising:
one or more computer-readable storage media and program instructions stored on the one or more computer-readable storage media, the program instructions comprising:
program instructions to receive message data from a natural language conversation among participants in a project;
program instructions to identify at least two tasks mentioned in the message data;
program instructions to determine a dependency between the at least two tasks based on the output of a sequential language model, wherein the messages associated with the at least two tasks are inputs to the sequential language model;
program instructions to generate a directed graph depicting the at least two tasks and the determined dependency of the at least two tasks;
program instructions to share a directed graph across participants; and
program instructions to notify participants who are blocked subsequent to completion of dependent tasks.

9. The computer program product of claim 8, wherein the sequential language model is based on a Bidirectional Encoder Representations from Transformer (BERT) model.

10. The computer program product of claim 9, the program instructions further comprising:
program instructions to tokenize the messages associated with the at least two tasks, wherein a separator token is inserted between the messages associated with the at least two tasks.

11. The computer program product of claim 10, wherein the tokenized messages include a classification token to identify a dependency between the messages associated with the at least two tasks.

12. The computer program product of claim 11, wherein the BERT model is trained to detect the dependency between the messages associated with the at least two tasks.

13. The computer program product of claim 8, wherein program instructions to identify the at least two tasks mentioned in the message data is based on a sentence structure of the messages associated with the at least two tasks.

14. The computer program product of claim 13, wherein the sentence structure of the messages associated with the at least two tasks are either imperative or declarative sentence structures.

15. A computer system comprising:
one or more computer processors;
one or more computer readable storage media; and
program instructions stored on the computer readable storage media for execution by at least one of the one or more processors, the program instructions comprising:
program instructions to receive message data from a natural language conversation among participants in a project;
program instructions to identify at least two tasks mentioned in the message data;
program instructions to determine a dependency between the at least two tasks based on the output of a sequential language model, wherein the messages associated with the at least two tasks are inputs to the sequential language model;
program instructions to generate a directed graph depicting the at least two tasks and the determined dependency of the at least two tasks;
program instructions to share a directed graph across participants; and
program instructions to notify participants who are blocked subsequent to completion of dependent tasks.

16. The computer system of claim 15, wherein the sequential language model is based on a Bidirectional Encoder Representations from Transformer (BERT) model.

17. The computer system of claim 16, the program instructions further comprising:
program instructions to tokenize the messages associated with the at least two tasks, wherein a separator token is inserted between the messages associated with the at least two tasks.

18. The computer system of claim 17, wherein the tokenized messages include a classification token to identify a dependency between the messages associated with the at least two tasks.

19. The computer system of claim 18, wherein the BERT model is trained to detect the dependency between the messages associated with the at least two tasks.

20. The computer system of claim 15, wherein program instructions to identify the at least two tasks mentioned in the message data is based on a sentence structure of the messages associated with the at least two tasks.

* * * * *